(12) United States Patent
Kim

(10) Patent No.: US 7,501,197 B2
(45) Date of Patent: Mar. 10, 2009

(54) CAP ASSEMBLY AND SECONDARY BATTERY WITH SAME

(75) Inventor: Tae-Yong Kim, Suwon-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 262 days.

(21) Appl. No.: 11/090,129

(22) Filed: Mar. 28, 2005

(65) Prior Publication Data

US 2005/0214634 A1  Sep. 29, 2005

(30) Foreign Application Priority Data

Mar. 29, 2004 (KR) ............ 10-2004-0021169

(51) Int. Cl.
*H01M 2/12* (2006.01)
(52) U.S. Cl. ............ 429/53; 429/57; 429/64; 429/82
(58) Field of Classification Search ......... 429/164, 429/82, 64, 53, 89, 57, 170, 133
See application file for complete search history.

(56) References Cited

U.S. PATENT DOCUMENTS

| | | | |
|---|---|---|---|
| 5,985,478 A | 11/1999 | Kim | |
| 6,497,978 B1 * | 12/2002 | Takada et al. | 429/185 |
| 6,620,544 B1 * | 9/2003 | Shin et al. | 429/56 |
| 6,900,616 B2 * | 5/2005 | Burrus et al. | 320/147 |
| 2002/0119364 A1 * | 8/2002 | Bushong et al. | 429/61 |
| 2003/0198870 A1 * | 10/2003 | Wariishi et al. | 429/313 |

FOREIGN PATENT DOCUMENTS

| | | |
|---|---|---|
| CN | 1309431 | 8/2001 |
| JP | 08-293293 | 11/1996 |
| JP | 09-147821 | 6/1997 |
| JP | 11-120979 | 4/1999 |
| JP | 11-219692 | 8/1999 |
| JP | 11-283600 | 10/1999 |
| JP | 2000-149918 | 5/2000 |
| JP | 2000-260409 | 9/2000 |

* cited by examiner

*Primary Examiner*—Patrick Ryan
*Assistant Examiner*—Ben Lewis
(74) *Attorney, Agent, or Firm*—Robert E. Bushnell, Esq.

(57) ABSTRACT

A secondary battery includes a container an electrode assembly mounted in the container having a positive electrode, a negative electrode, and a separator interposed between the positive electrode and the negative electrode, and a cap assembly fixed to the container to seal the container. The cap assembly includes a cap plate having a terminal, a current breaker electrically connected to the cap plate; and a vent plate having a safety vent electrically connected to the current breaker, the shape of the vent plate being altered by the internal pressure of the secondary battery to alter the shape of the current breaker, and the current breaker cutting off the current path of the cap assembly.

22 Claims, 5 Drawing Sheets

CAP ASSEMBLY AND SECONDARY BATTERY WITH SAME

CLAIM OF PRIORITY

This application makes reference to, incorporates the same herein, and claims all benefits accruing under 35 U.S.C. §119 from an application for Cap assembly and Secondary battery thereof earlier filed in the Korean Intellectual Property Office on 29 Mar. 2004 and there duly assigned Ser. No. 10-2004-0021169.

BACKGROUND OF THE INVENTION

1. Technical Field

The present invention relates to a secondary battery, and more particularly, to a cap assembly of the secondary battery.

2. Description of the Related Art

A secondary battery is a rechargeable battery that can be made into a small size or a high power. Common types of secondary batteries include the nickel-hydrogen battery, the lithium battery and the lithium-ion battery. The lithium-ion secondary battery can have a various shape, for example, square and cylindrical batteries.

For the lithium-ion battery, when it is excessively charged or its positive electrode and negative electrode are short-circuited, the electrolyte with lithium salt and organic solvent is electrolyzed at the positive electrode and the lithium metal is extracted at the negative electrode, and thereby the deterioration of the battery characteristics and the short-circuit occur. In particular, excessive charge generates excessive current, which damages an apparatus using the battery as a power source. Moreover, excessive charge generates gas to increase the internal pressure, which may cause explosion and ignition of the battery.

In an effort to overcome these difficulties, the lithium-ion battery generally has a safety device thereinside, such as a shut-down separator, a PTC device to cutoff current when the temperature increases, and a safety vent to discharge the pressure when the internal pressure increases.

For example, U.S. Pat. No. 5,985,478 entitled Pressure responsive cap assembly for rectangular battery to Kim, and issued on Nov. 16, 1999, discloses a safety device in which a through-hole formed on the negative electrode is simply riveted by use of a rivet connected to a tab while an insulator and a gasket are disposed over and below the negative electrode.

However, the above structure has a limit to increasing sealing capacity, and in particular, since the secondary battery generates a large amount of gas from the inside, it has a problem that the sealing capacity of the through-hole decreases relatively.

Japanese Patent Laid-open No. 11-219692 discloses a thin metal plate to seal a hole of a cap plate. However, this structure has a problem in that there occurs a crack in a safety vent when the external physical impact is loaded.

Moreover, if the secondary battery used as a power source for an electronic device generates excessive current, the excessive current is transmitted to the electronic device to thereby damage the electronic device. Especially, such problems are more serious to the battery for a motor driven device which repeats the charge and discharge within a short time.

Accordingly, there is a need for a safety device which can prevent the explosion and cutoff excessive current when it occurs.

SUMMARY OF THE INVENTION

It is therefore an object of the present invention to provide a cap assembly for a battery.

It is another object of the present invention to provide an improved secondary battery.

It is also an object of the present invention to provide a secondary battery which can prevent the explosion due to the increase of the internal pressure, and also cutoff excessive current in advance.

According to one aspect of the present invention, a cap assembly for a secondary battery may be constructed with a cap plate having a terminal, and a vent plate having a vent, the vent plate having a shape being able to alter when an internal pressure of the secondary battery is higher than a prescribed level, and a current breaker electrically connected to the cap plate and the vent plate, the current breaker altering its shape when the shape of the vent plate alters, the alteration of the shape of the current breaker electrically disconnecting the current breaker from the cap plate to cut off a current path of the cap assembly.

The current breaker can have an arc-shaped member having a concave portion with a predetermined curvature.

Both ends of the current breaker can have a bend portion bent toward an opposite direction to the concave portion to contact the cap plate.

The current breaker can have a disk-shaped member having a concave portion with a predetermined curvature.

A circumference of the current breaker can have a bend portion bent toward an opposite direction to the concave portion to contact the cap plate.

The cap assembly further includes an insulator disposed between the cap plate and the current breaker to function as a fulcrum to alter the shape of the current breaker.

The insulator can be fixed to the cap plate.

The current breaker can be formed with one selected from the group consisting of Bi-metal, Tri-metal, and a ductile metal.

The cap plate, the current breaker and the vent plate can be assembled with a gasket made of insulating material to form one unit.

According to another aspect of the invention, a secondary battery comprises a container, an electrode assembly mounted in the container having a positive electrode, a negative electrode, and a separator interposed between the positive electrode and the negative electrode, and a cap assembly fixed to the container to seal the container. The cap assembly may be constructed with a cap plate having a terminal, and a vent plate having a vent, the vent plate having a shape being able to alter when an internal pressure of the secondary battery is higher than a prescribed level, and a current breaker electrically connected to the cap plate and the vent plate, the current breaker altering its shape when the shape of the vent plate alters, the alteration of the shape of the current breaker electrically disconnecting the current breaker from the cap plate to cut off the current path of the cap assembly.

According to the other aspect of the invention, a secondary battery comprises a cap plate having a terminal, a vent plate having a vent, a shape of the vent plate changing from a first shape to a second shape when an internal pressure of the secondary battery becomes higher than a prescribed level, a current breaker disposed between the cap plate and the vent plate, the current breaker electrically connected to the cap plate and the vent plate when the vent plate has the first shape, the current breaker electrically disconnected from the cap plate to cut off a current path of the cap assembly when the vent plate has the second shape, and an insulator disposed between the cap plate and the current breaker to function as a fulcrum to alter the shape of the current breaker.

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE PREFERRED EMBODIMENTS

Figure 1:
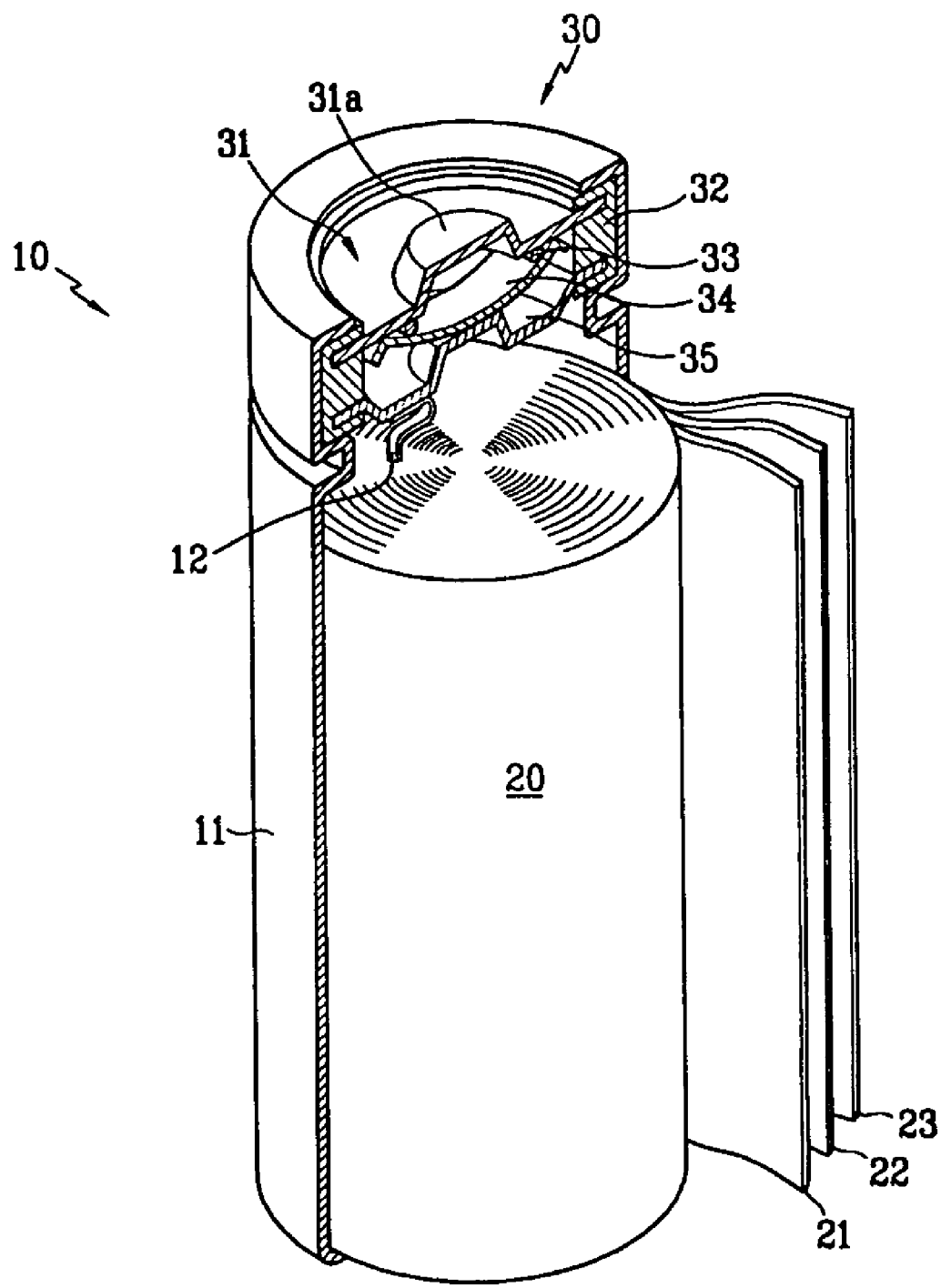
FIG. 1 is a partial cut perspective view of a secondary battery according to a first preferred embodiment of the present invention.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 2:
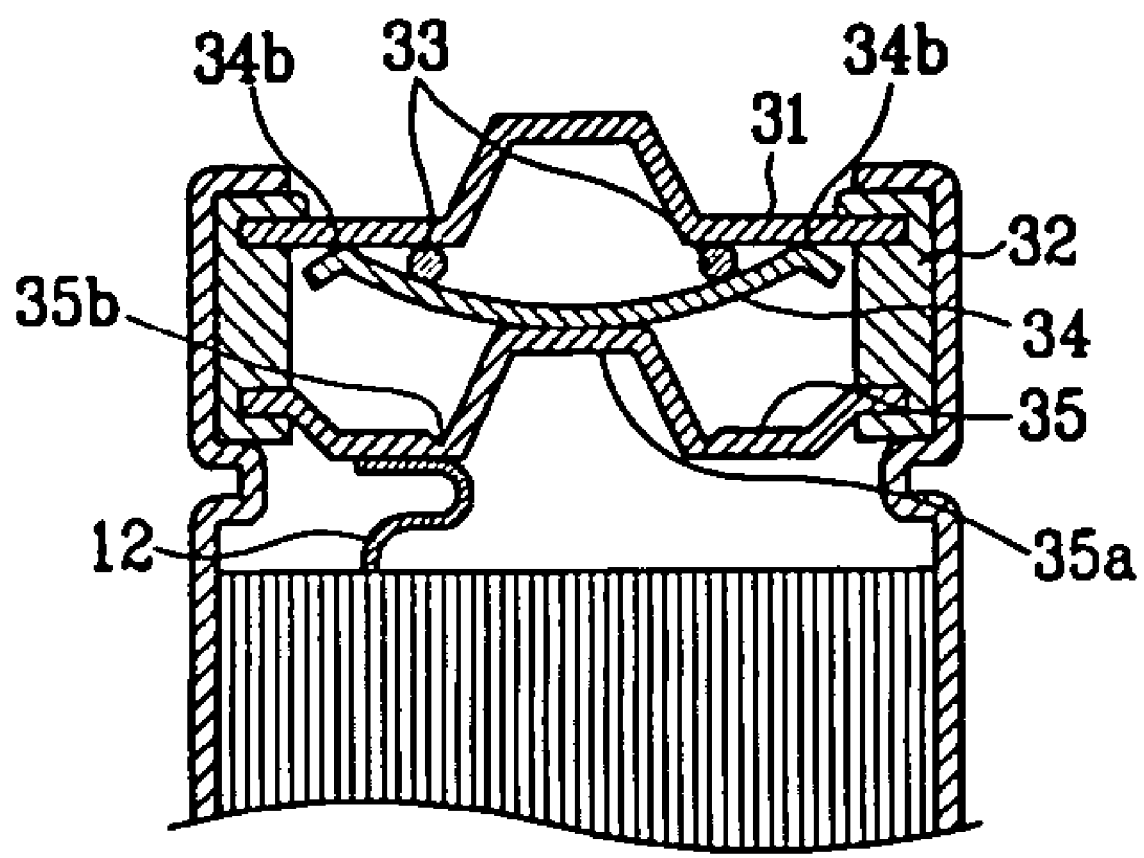
FIG. 2 is a partial cross-sectional view of the secondary battery according to the first preferred embodiment of the present invention.
Figure 3:
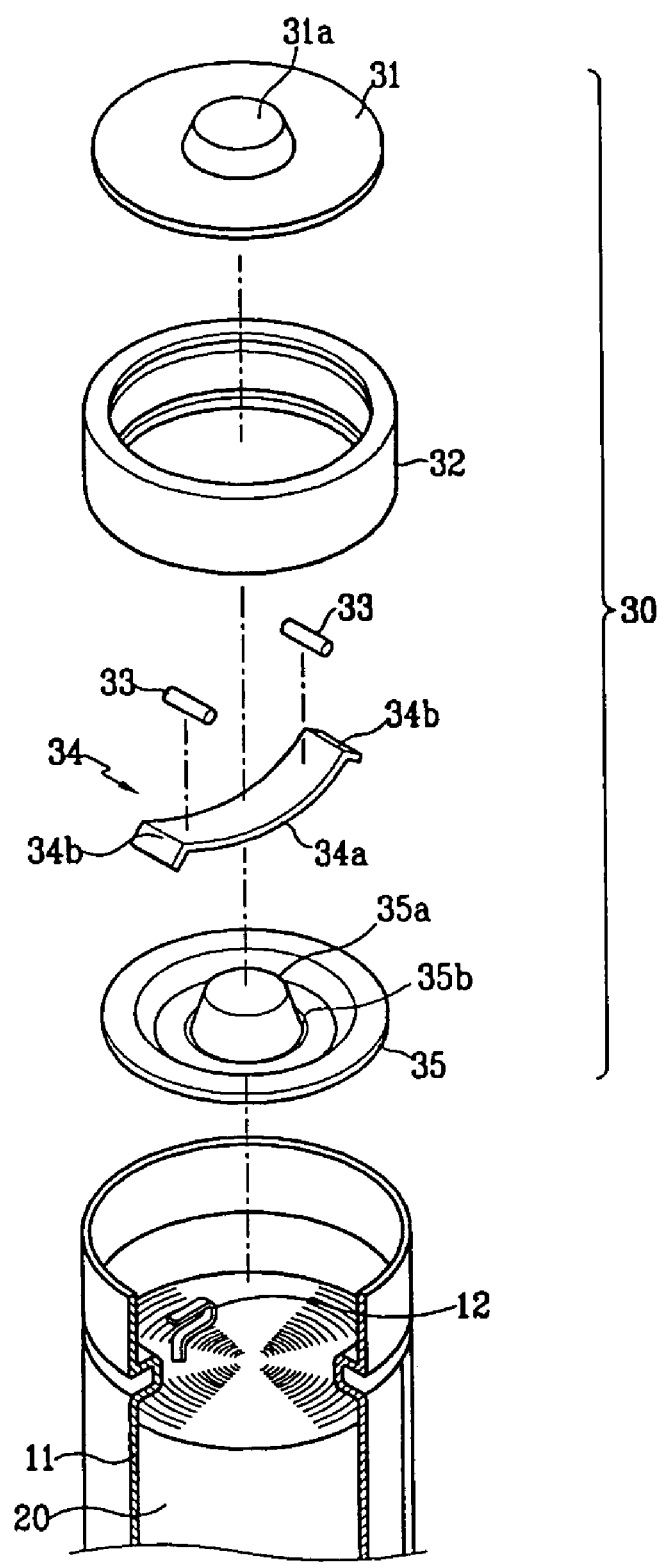
FIG. 3 is an exploded perspective view of the cap assembly according to the first preferred embodiment of the present invention.

FIG. 1 is a partial cut perspective view of a secondary battery according to a first preferred embodiment of the present invention, FIG. 2 is a partial cross-sectional view of the secondary battery according to the first preferred embodiment of the present invention, and FIG. 3 is an exploded perspective view of the cap assembly according to the first preferred embodiment of the present invention.

As shown in FIG. 1, the secondary battery 10 includes a container 11 having an opening formed on one of its sides, an electrode assembly 20 mounted in the container 11 having a positive electrode 21, a negative electrode 23 and a separator 22 for insulation interposed between those two plates, and a cap assembly 30 to close off and seal the opening of the container 11.

The container 11 is preferably made of conductive metal such as aluminum and aluminum alloy, and it has preferably a cylindrical shape which has an inner space to receive the electrode assembly 20. However, its shape is not limited to this shape.

The electrode assembly 20 has a stacked layer structure such that the separator 22 is placed between the positive electrode 21 and the negative electrode 23 the collectors of which are coated with the corresponding active materials, or it has a jellyroll structure such that the positive electrode 21, the negative electrode 23 and the separator 22 in a stacked layer are wound into a jellyroll configuration.

The container 11 of this embodiment has a cylindrical shape and the electrode assembly 20 has a jellyroll configuration.

The electrode assembly 20 is mounted inside the container 11 to contact the negative electrode 23 with the container 11, and thereby the container forms a negative terminal of the secondary battery 10. The positive electrode 21 is electrically connected to the cap assembly 30 through a lead tab 12, and thereby the cap assembly 30 forms a positive terminal of the secondary battery 10.

The cap assembly 30 is mounted on the opening of the container 11 to close and seal off the container 11, and its detailed structure is as follow.

As shown in FIG. 1, FIG. 2, and FIG. 3, the cap assembly 30 includes the cap plate 31 with a terminal 31a, an insulator 33, a current breaker 34 and a vent plate 35, which are sequentially disposed. These are assembled with a gasket 32 made of insulation material to form one unit.

The gasket 32 electrically insulates the cap assembly 30 and the container 11 when the cap assembly 30 is assembled with the container 11.

When forming the unit, the current breaker 34 is arranged to contact a part, preferably both ends, of the current breaker 34 with the cap plate 31 while the insulator 33 is interposed between the cap plate 31 and the current breaker 34.

The current breaker changes its shape when external force is applied to the current breaker 34 so that the contacted portion may be detached from the cap plate 31. A various shape can be made for the current breaker.

In the first preferred embodiment as shown in FIGS. 1, 2 and 3, the current breaker 34 has an arc-shaped member having a concave portion 34a with a predetermined curvature, and its both ends have a bend portion 34b bent toward an opposite direction to the concave portion 34a.

Figure 4:
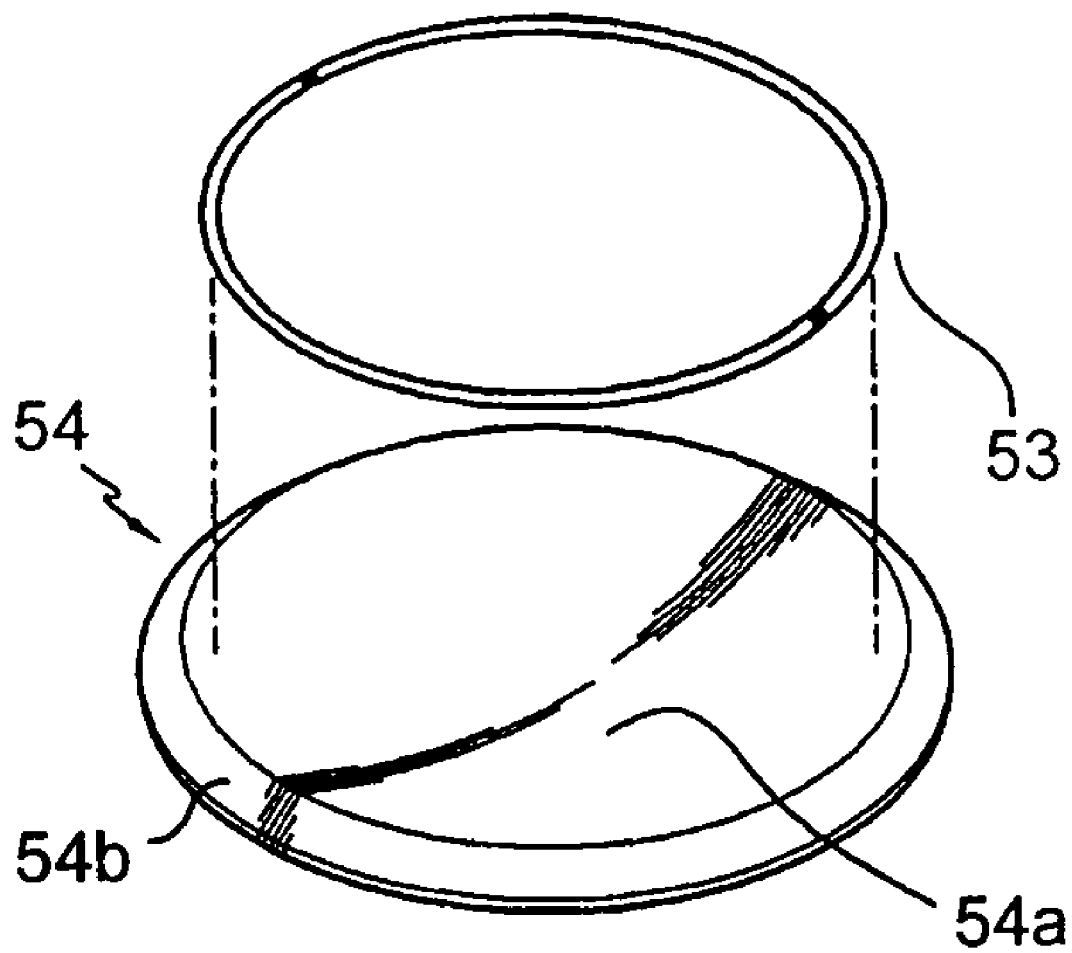
FIG. 4 is a perspective view of a current breaker of a cap assembly according to a second preferred embodiment of the present invention.

In the second preferred embodiment as shown in FIG. 4, the current breaker 54 has a disk shape. The current breaker 54 has a concave portion 54a with a predetermined curvature, and a bend portion 54b bent along its circumference toward an opposite direction to the concave portion 54a to be fixed to the cap plate as the same way as the bend portion 34b of the current breaker 34.

The current breaker 34 in the first preferred embodiment enables the cap plate 31 to contact the two bend portions 34b. The bend portions 34b, 54b can be fixed to the cap plate 31 by welding. The bend portions 34b, 54b may be fixed to the cap plate 31 by welding in such a way that the bend portions 34b, 54b may be electrically disconnected, preferably separated, from the cap plate 31 when external force is applied to the current breaker 34.

Alternatively, the bend portions 34b, 54b can be fixed to the cap plate 31 by a mechanical structure.

The current breaker 34, 54 is preferably made of electrically conductive and elastic material. For example, the current breaker 34, 54 is made of Bi-metal with sus(stainless steel)-Cu or Tri-metal with sus(stainless steel)-Cu-sus(stainless steel) to flip-flop by elastic force. Moreover, the current breaker 34, 54 can be made of ductile metal such as lead (Pb) or aluminum (Al).

The insulator 33, 53 is respectively arranged where corresponds to the bend portion 34b, 54b of the cap plate 31 to be fixed to the cap plate 31, and it contacts the bend portion 34b, 54b when the current breaker 34, 54 is connected to the cap plate 31.

Preferably, the insulator has a circular cross-sectional shape, and can be made of insulating material such as rubber, polymer, or silicon.

In the first preferred embodiment, the insulator 33 shown in FIG. 1, FIG. 2, and FIG. 3 has a cylindrical shape corresponding to the bend portion 34b of the current breaker 34, and the insulator 53 in the second preferred embodiment as shown in FIG. 4 has a ring shape corresponding to the bend portion 54b of the current breaker 54.

The vent plate 35 arranged under the current breaker 34, 54 has a cone-shaped protrusion 35a (hereinafter referred to as a vent) at its center, and it allows the vent 35a to contact the current breaker 34 to be assembled with the gasket 32.

The structural characteristic of the vent plate 35 allows vent plate 35 to modify its shape according to the change of the internal pressure of the secondary battery 10. The modification of the shape of the vent plate 35 enables the current breaker 34 connected thereto to flip-flop.

A lead tab 12 connected to the positive electrode 21 of the electrode assembly 20 is connected to the vent plate 35.

Meanwhile, the region of the vent plate 35 where the vent 35a is formed has a notch 35b which enables the vent 35a to break when the internal pressure of the secondary battery 10 increases to a level higher than a prescribed level.

Accordingly, the secondary battery 10 of the present invention having the cap assembly 30 described above leads the current generated from the positive electrode 21 of the electrode assembly 20 in the sequence of the lead tab 12 to the vent plate 35 to the current breaker 34, 54 to the cap plate 31.

Figure 5:
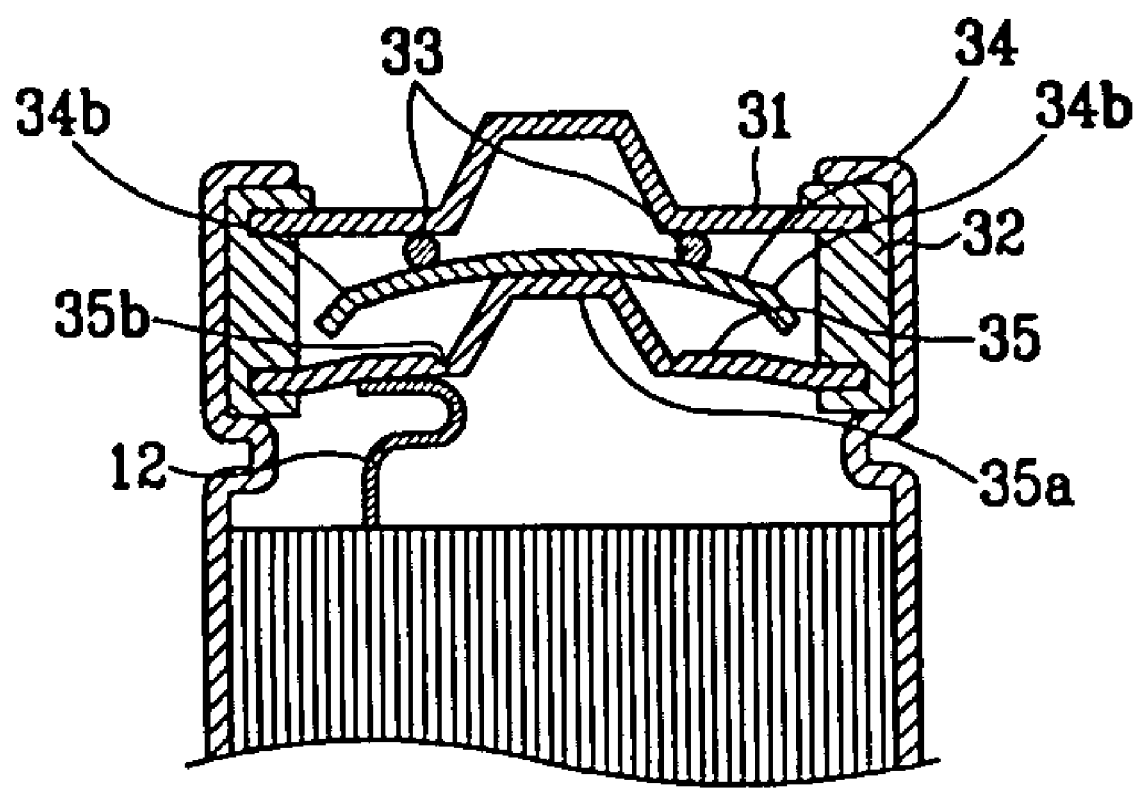
FIG. 5 is a cross-sectional view of the secondary battery according to the first preferred embodiment of the present invention to show how to work.

If the secondary battery 10 has a higher internal pressure than the prescribed level, the vent plate 35 rises to alter its shape by the increased internal pressure. The alternation of the shape of the vent plate 35 makes the shape of the current breaker 34 changed to electrically disconnect the current breaker from the cap plate 31 as shown in FIG. 5. While the insulator 33 supports the current breaker 34, it functions as a fulcrum to easily alter the shape of the current breaker 34.

When the shape of the current breaker 34 is altered, the current breaker 34 separates the bend portion 34b contacted with the cap plate 31 from the cap plate 31 as shown in FIG. 5, and thereby the current breaker 34 becomes electrically insulated from the cap plate 31 to cutoff the current path to the cap assembly 30.

Accordingly, the secondary battery 10 can prevent the battery from exploding due to the increase the internal pressure by cutting off the current path in advance.

Meanwhile, since the vent 35a of the vent plate 35 is broken when the internal pressure of the secondary battery 10 is higher than the prescribed level, the secondary battery 10 loses its function as a battery.

As described above, the secondary battery of the present invention can prevent the explosion due to the increase of the internal pressure, and also cuts off excessive current. Furthermore, the secondary battery cut off excessive current to an apparatus using a battery as a power source to thereby protect the apparatus from excessive current.

The secondary battery of the present invention can be used as the power source for motor driving devices such as the hybrid electric vehicles, electric vehicles, wireless vacuum cleaners, motorbikes, or motor scooters.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:

1. A cap assembly for a secondary battery, comprising:
a cap plate having a terminal;
a vent plate having a vent, the vent plate having a shape being able to alter when an internal pressure of the secondary battery is higher than a prescribed level; and
a current breaker electrically connected to the cap plate and the vent plate,
wherein the current breaker has an arc-shaped member having a concave portion with a predetermined curvature,
wherein both ends of the current breaker have a bend portion to contact the cap plate,
the current breaker altering its shape when the shape of the vent plate alters, the alteration of the shape of the current breaker electrically disconnecting the current breaker bent portion contacted with the cap plate from the cap plate to cut off a current path of the cap assembly.

2. The cap assembly for a secondary battery of claim 1, wherein the current breaker has an arc-shaped member having a concave portion with a predetermined curvature.

3. The cap assembly for a secondary battery of claim 2, wherein both ends of the current breaker have a bend portion to contact the cap plate.

4. The cap assembly for a secondary battery of claim 3, wherein the bend portion is fixed to the cap plate by welding.

5. The cap assembly for a secondary battery of claim 1, wherein the current breaker has a disk-shaped member having a concave portion with a predetermined curvature.

6. The cap assembly for a secondary battery of claim 5, wherein a circumference of the current breaker has a bend portion to contact the cap plate.

7. The cap assembly for a secondary battery of claim 6, wherein the bend portion is fixed to the cap plate by welding.

8. The cap assembly for a secondary battery of claim 1, further including an insulator disposed between the cap plate and the current breaker to function as a fulcrum to alter the shape of the current breaker.

9. The cap assembly for a secondary battery of claim 8, wherein the insulator is fixed to the cap plate.

10. The cap assembly for a secondary battery of claim 1, wherein the current breaker is made of bi-metal or tri-metal.

11. The cap assembly for a secondary battery of claim 1, wherein the current breaker is made of a ductile metal.

12. The cap assembly for a secondary battery of claim 1, wherein the cap plate, the current breaker and the vent plate are assembled with a gasket made of insulating material to form one unit.

13. The cap assembly for a secondary battery of claim 1, wherein the current breaker is made of electrically conductive and elastic material.

14. A secondary battery, comprising:
a container;
an electrode assembly mounted in the container having a positive electrode, a negative electrode, and a separator interposed between the positive electrode and the negative electrode;
and
a cap assembly mounted on the container to seal the container, the cap assembly comprising:
a cap plate having a terminal;
a vent plate having a vent, the vent plate having a shape being able to alter when an internal pressure of the secondary battery is higher than a prescribed level; and
a current breaker electrically connected to the cap plate and the vent plate,
wherein the current breaker is selected from the group consisting of an arc-shaped member having a concave portion with a predetermined curvature and a disk-shaped member having a concave portion with a predetermined curvature,
wherein a circumference of the current breaker has a bend portion to contact the cap plate,
the current breaker altering its shape when the shape of the vent plate alters, the alteration of the shape of the current breaker electrically disconnecting the current breaker bent portion contacted with the cap plate from the cap plate to cut off a current path of the cap assembly.

15. The secondary battery of claim 14, wherein the current breaker is selected from the group consisting of an arc-shaped member having a concave portion with a predetermined curvature and a disk-shaped member having a concave portion with a predetermined curvature.

16. The secondary battery of claim 15, wherein a circumference of the current breaker has a bend portion to contact the cap plate.

17. The secondary battery of claim 16, wherein the bend portion is fixed to the cap plate by welding or a mechanical structure.

18. The secondary battery of claim 14, wherein the cap assembly further comprises an insulator disposed between the cap plate and the current breaker to function as a fulcrum to alter the shape of the current breaker.

19. The secondary battery of claim 14, wherein the current breaker is made of bi-metal, tri-metal, or a ductile metal.

20. The secondary battery of claim 14, wherein the cap plate, the current breaker and the vent plate are assembled with a gasket made of insulating material to form one unit.

21. The secondary battery of claim 14, wherein the secondary battery has a cylindrical shape.

22. The secondary battery of claim 14, wherein the secondary battery is for a motor driven device.

* * * * *